(12) United States Patent
Wu et al.

(10) Patent No.: US 6,742,899 B1
(45) Date of Patent: Jun. 1, 2004

(54) COOLING APPARATUS FOR PROJECTOR CASING

(75) Inventors: Shang-Hsuang Wu, Hsin-Chu (TW); Nien-Hui Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/249,474

(22) Filed: Apr. 14, 2003

(30) Foreign Application Priority Data

Apr. 17, 2002 (TW) .................................. 091205459 U

(51) Int. Cl.[7] .......................... G03B 21/16; G03B 21/20
(52) U.S. Cl. .......................... 353/61; 353/60; 362/264; 362/294
(58) Field of Search .......................... 353/57, 58, 60, 353/61, 119; 362/294, 264, 263

(56) References Cited

U.S. PATENT DOCUMENTS

| | | | | |
|---|---|---|---|---|
| 4,925,295 A | * | 5/1990 | Ogawa et al. ................. | 353/57 |
| 5,287,132 A | * | 2/1994 | Suzuki et al. ................ | 353/119 |
| 5,722,753 A | * | 3/1998 | Okada et al. ................ | 353/119 |
| 5,842,761 A | * | 12/1998 | Futakami et al. ........... | 353/119 |
| 6,004,010 A | * | 12/1999 | Inage et al. ................. | 362/294 |
| 6,283,614 B1 | * | 9/2001 | Okada et al. ................ | 362/294 |
| 6,398,366 B1 | * | 6/2002 | Hara et al. .................... | 353/57 |
| 6,494,581 B2 | * | 12/2002 | Shimizu ....................... | 353/61 |
| 6,575,599 B1 | * | 6/2003 | Imamura et al. ............ | 362/294 |

* cited by examiner

*Primary Examiner*—William C. Dowling
(74) *Attorney, Agent, or Firm*—Winston Hsu

(57) ABSTRACT

The present invention comprises a lamp holder with a lamp inside a casing; at least one guiding surface at the lower edge proximate one side of the lamp holder; a ventilation outlet disposed on the lamp holder at a position corresponding to one side of the guiding surface proximate the casing; an upper sheet at the top of the lamp holder keeping a specific distance from the casing to define an upper air duct; a lower sheet at the bottom of the lamp holder keeping a specific distance from the casing to define a lower air duct and connecting to the guiding surface. A fan proximate one side of the guiding surface for blowing the air through the lamp holder and the upper and lower air ducts, then discharge the hot air from the ventilation outlet for the heat dispersion. Therefore, this invention reducing the temperature of the lamp which near the casing.

11 Claims, 6 Drawing Sheets

COOLING APPARATUS FOR PROJECTOR CASING

BACKGROUND OF INVENTION

1. Field of the Invention

The present invention relates to a projector, and more particularly, to a cooling apparatus for projector casing for shielding the radiant heat.

2. Description of the Prior Art

In general, a projector usually uses a high power light bulb as the light source to provide a bright and clear image and offer a comfortable viewing environment for audiences, and thus turning the light bulb into the largest heat source of the projector. The temperature of the upper and lower casings adjacent to the light bulb is higher than the temperature at other parts of the casings. To assure the user's safety and improve the product quality, prior-art projectors usually use fans to cool and reduce the temperature of the casing.

Please refer to FIG. 1 for a projecting light source 10 of a conventional projector, which comprises a light bulb 11 coupled to a lamp holder 13 by a movable fixture 12, and the lamp holder 13 being fixed to a lower casing 15, by a screw 14; wherein an upper casing 16 of the projector being disposed at a position as close as possible to the lamp 11 to minimize the thickness of the projector and meet the consumer's requirements for a modern compact equipment. Therefore, although there is a cooling fan (not shown in the figure) on one side of the lamp 11, the lamp at its top has no shelter. Therefore, the upper casing 16 and the lamp holder 13 adjacent to the lamp 11 will still be heated up by the radiant heat and hot air produced by the high temperature of the lamp 11, and conducted through the lamp holder 13 to the lower casing 15 near the lamp holder 13, causing the temperature of the upper and lower casings of the projector near the light source 10 higher than the temperature of other parts of the casing. It does not only heat up the plastic casing to a high temperature, but also expedites the deterioration; even for metal casings, it will also produce heat of high temperature, which makes the use of projector unsafe and inconvenient.

In FIG. 2, it shows another light source 20 of a conventional projector, wherein a lamp 21 being coupled to a lamp holder 22; a lamp housing 23 being disposed inside the projector; the lamp holder 22 being placed and coupled into the lamp housing 23 from the bottom of the lamp housing through a slot (not shown in the figure) of the lower casing 25; and a fan 24 being disposed on one side of the lamp housing for cooling the lamp 21. Although a cover 231 not fully closed is disposed at the top of the lamp housing 23 for shielding the lamp 21 from directly lighting up the upper casing 26, the cover 231 of the lamp housing 23 closely attaches onto the upper casing 26 of the projector. Therefore, the radiant heat of the lamp 21 will still be conducted through the cover 231 and the lamp holder 22 to the upper and lower casings 25, 26. There is a gap between the cover 231 and the upper casing 26 due to the error of manufacturing or assembling, but it does not constitute an air duct for the airflow. The air in the gap remains still and is heated up continuously, which also ends up a high temperature it causes the temperature at the upper and lower casings adjacent to the light source 20 higher than other parts of the housing, and thus having the shortcoming of making the application of the projector unsafe and inconvenient.

SUMMARY OF INVENTION

The objective of the present invention is to provide a cooling apparatus for projector casing by using a sheet as a shielding for the radiant heat and facilitating the airflow to isolate the radiant heat and the hot air of high temperature near the lamp in order to reduce the temperature of the casing and improve the quality of the product.

To achieve the foregoing objective, the present invention comprises a lamp holder with a lamp inside a casing; at least one guiding surface at the lower edge proximate one side of the lamp holder; an ventilation outlet disposed on the lamp holder at a position corresponding to one side of the guiding surface proximate the casing; an upper sheet at the top of the lamp holder keeping a specific distance from the casing to define an upper air duct; a lower sheet at the bottom of the lamp holder keeping a specific distance from the casing to define a lower air duct and connecting to the guiding surface for installing a fan proximate one side of the guiding surface in order to blow the air through the lamp holder and the upper and lower air ducts and then discharge the hot air from the ventilation outlet for the heat dispersion.

BRIEF DESCRIPTION OF DRAWINGS

Other features and advantages of the present invention will become apparent in the following detailed description of the preferred embodiments with reference to the accompanying drawings, in which.

DETAILED DESCRIPTION

To make it easier for our examiner to understand the technology, measures, and effects of this invention, please refer to the detailed specification together with the attached drawing for the innovative features, and performance.

Figure 1:
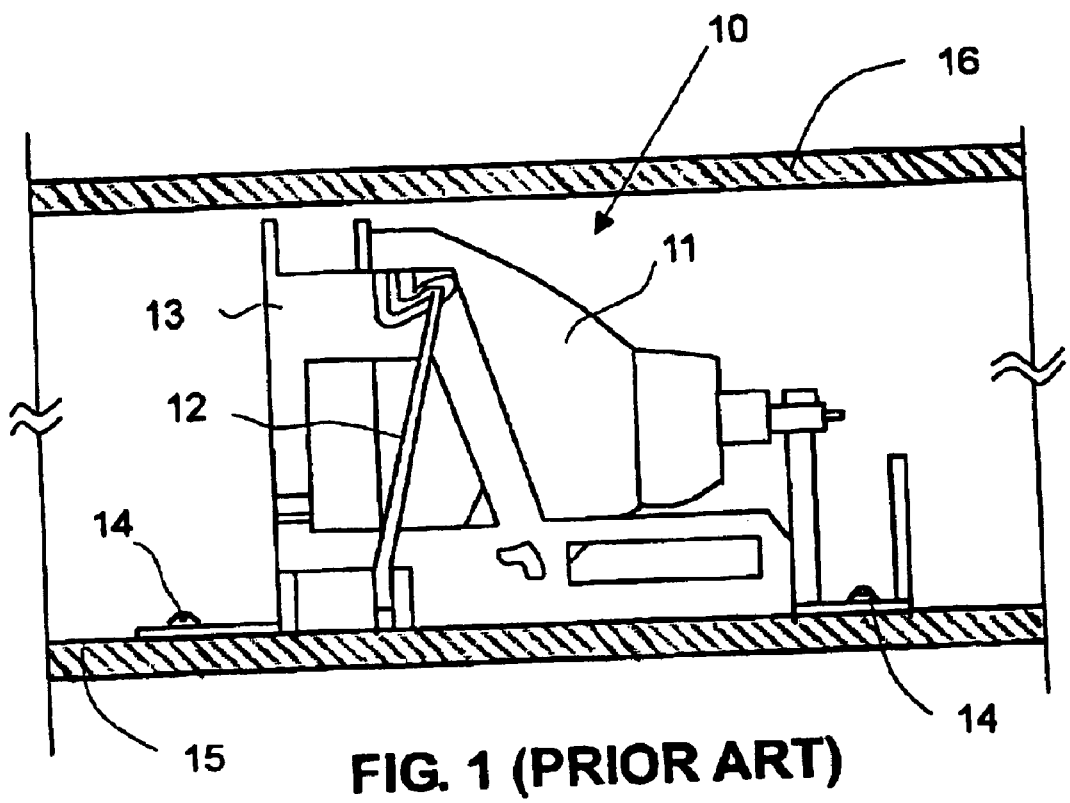
FIG. 1 is a cross-sectional diagram of the side view of the light source and the casing according to the prior art.
Figure 2:
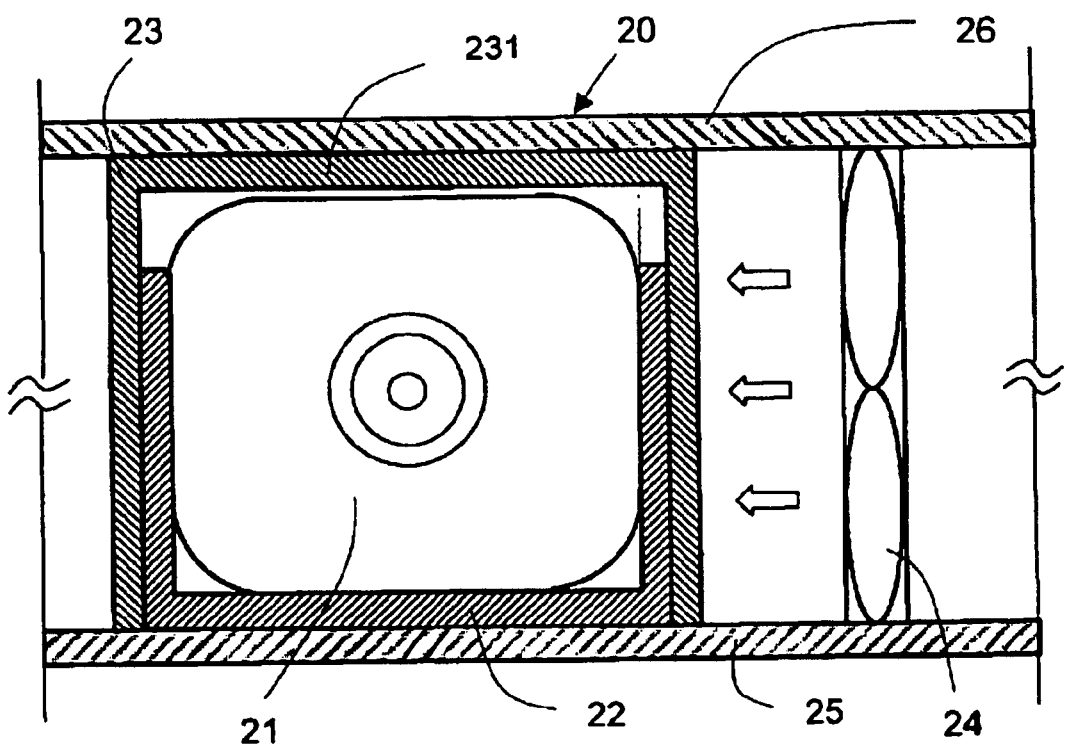
FIG. 2 is a cross-sectional diagram of the rear view of the other light source and the casing according to the prior art.
Figure 3:
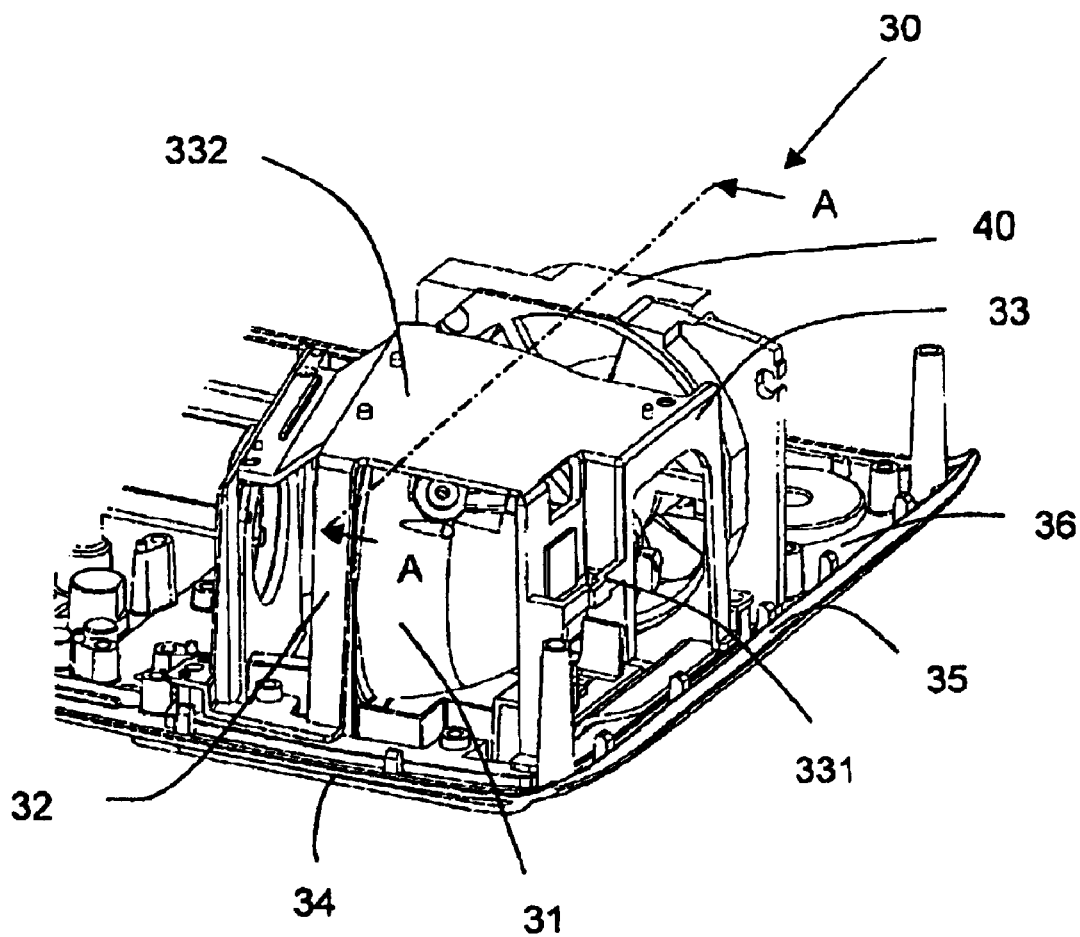
FIG. 3 is a perspective diagram of the cooling apparatus for projector casing according to the present invention.

Please refer to FIG. 3 for the cooling apparatus for projector casing according to a preferred embodiment of the present invention, which comprises a lamp 31, a lamp holder 32, a lamp housing 33, a secondary ventilation outlet 34, a lower casing 35, and a fan 40. The lamp 31 is coupled inside the lamp holder 32, and then placed and fixed into the lamp housing 33 proximate the secondary ventilation outlet 34 of the lower casing 35, and the fan 40 disposed on one side of the lamp housing 33 drives the air to disperse heat.

Among which, the secondary ventilation outlet 34 is disposed at one side of the lower casing 35 of the projector, and the lower casing 35 has a base 36; a cooling apparatus for projector casing 30 is disposed at the secondary ventilation outlet 34 proximate the base 36; a support 331 is extended from the base 36 around the cooling apparatus for projector casing 30 to define a lamp housing 33; an upper sheet 332 constitutes the top of the lamp housing 33 to cover the lamp 31 and isolate the radiant heat produced by the upward illumination of the high temperature lamp 31. The upper sheet 332 couples and fixes to the lamp holder 32 by the lamp housing 33.

Figure 4:
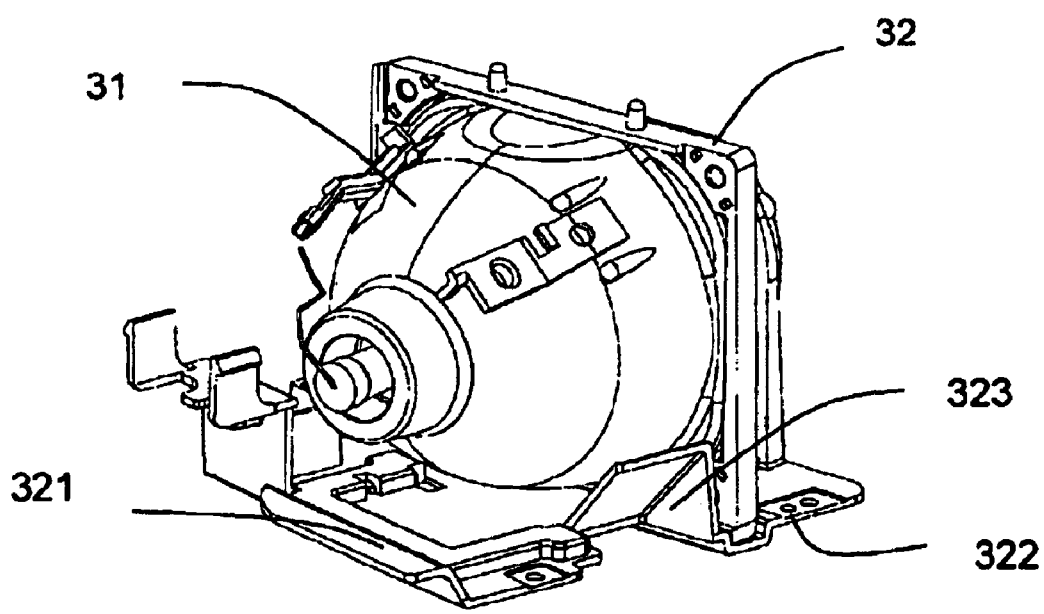
FIG. 4 is a perspective diagram of the light source according to the present invention.

In FIG. 4, the lamp holder 32 of the projector in accordance with the present invention has a lamp 31 installed in the lamp holder 32; a lower sheet 322 is disposed on the lower surface of a bottom bracket 321 of the lamp holder 32, and the lower sheet 322 covers the whole lower surface of the bottom bracket 321 to isolate and downwardly radiate the radiant heat produced by the high-temperature lamp 31 and the high-temperature hot air nearby; a hollow guiding surface 323 is disposed on one side of the bottom bracket 321 of the lamp holder 32 proximate the lower edge and connected to the lower sheet 322 that constitutes the projecting light source of the projector.

Figure 5:
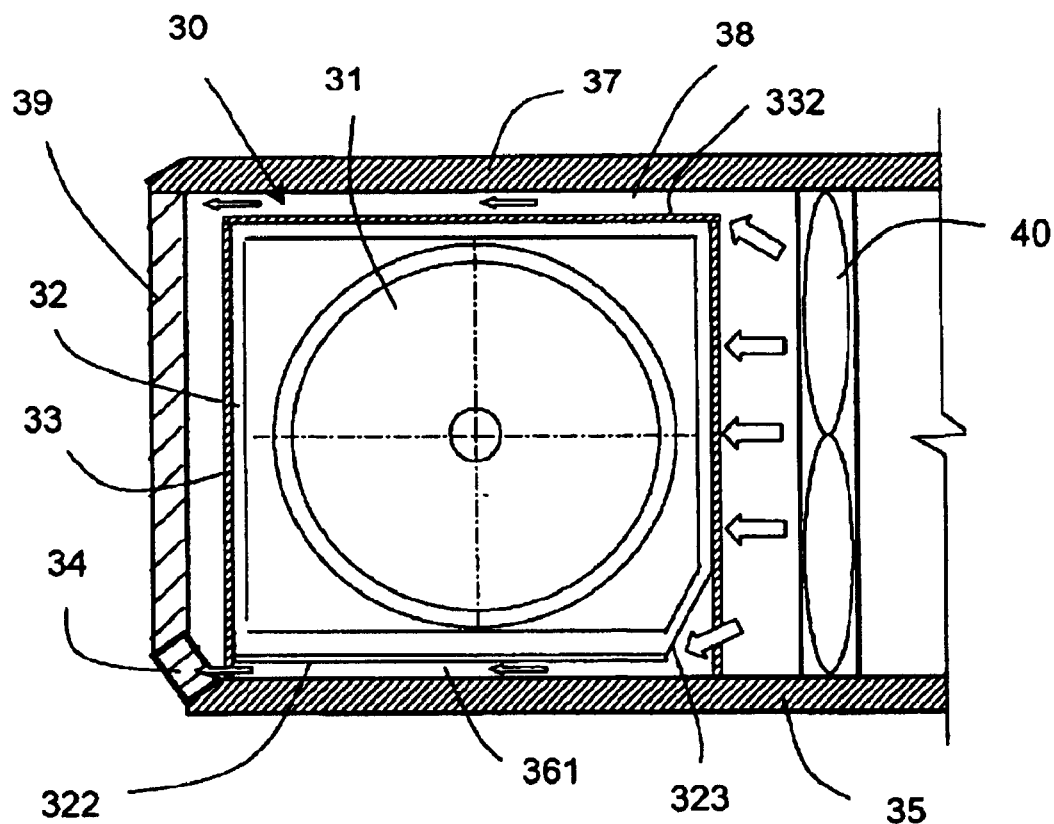
FIG. 5 is a cross-sectional diagram of the cooling apparatus for projector casing according to the present invention.

Please refer to FIG. 5 for the cooling apparatus for projector casing 30 of the present invention. The lamp housing 33 is disposed into the projector housing composed of an upper casing 35 and a lower casing 37 and located proximate the secondary ventilation outlet 34 of the lower casing 35; an upper sheet 332 disposed at the top of the lamp housing 33 and keeping an appropriate distance from the upper casing 37 to form a gap between the upper sheet 332 and the upper casing 37 and constitute the upper air duct 38 to avoid the heat being conducted to the upper casing 37. Furthermore, a ventilation outlet 39 is disposed on the casing proximate one side of the lamp housing 33; a fan 40 is disposed next to the other side of the lamp housing 33; the light source including the lamp 31 and the lamp holder 32 are coupled Into the lamp housing 33 such that the side of lamp holder 32 having the guiding surface faces the fan 40 and keeps a gap between the lower sheet 322 at the lower side of the lamp holder 32 and the lower casing 35 to form a lower air duct 361; one side of the lower air duct 361 faces the secondary ventilation outlet 34 of the lower casing 35 to prevent the heat being conducted to the lower casing 35.

When the cooling apparatus according to the present invention disperses performs heat dispersion, the fan 40 drives the air to flow towards the lamp housing 33; most of the air pass through the lamp housing 33 and the lamp 31, then discharge from the ventilation outlet 39 to cool the lamp 31. Part of the air flows through the upper air duct 38 and discharges through the upper end of the ventilation outlet 39, such that when the upper sheet 332 bearing the radiant heat of the high-temperature lamp 31 generates a convection of heat, and such part of the air cools the upper sheet 332 to reduce the conduction of heat to the upper casing 37, therefore, reducing the temperature of the upper casing 37 near the top of the lamp 31. Furthermore, part of the air blown from the fan 40 passes through the guiding surface 323 at the lower side of the lamp holder 32 to guide the airflow into the lower air duct 361, and discharge the hot air through the secondary ventilation outlet 34 of the lower casing 35, such that when the lower sheet 322 bearing the radiant heat of the high temperature lamp 31 generates a convection of heat, such part of the air cools the lower sheet 332 to reduce the conduction of heat to the lower casing 35 and also reduce the temperature of the lower casing 35 near the bottom of the lamp 31.

Figure 6:
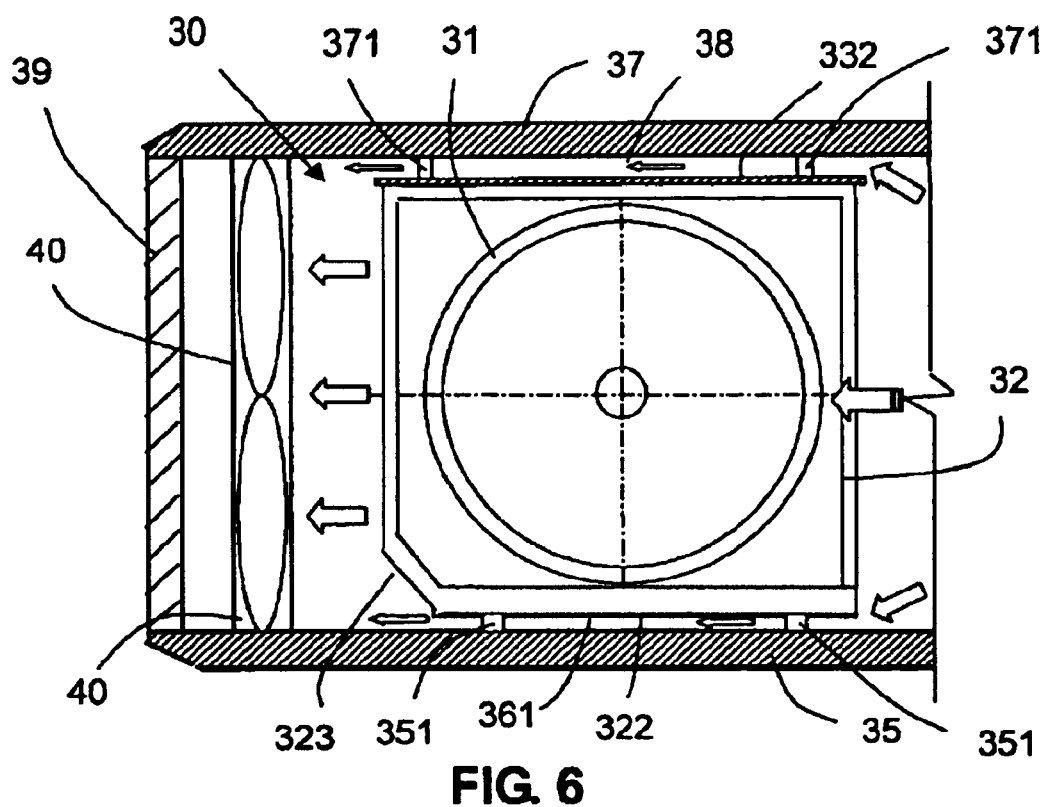
FIG. 6 is a cross-sectional diagram of the cooling apparatus for projector casing according to the other embodiment of the present invention.

Similarly, refer to FIG. 6 for the other embodiment of the present invention, which fix the lamp holder 32 onto the casing without the lamp casing 33. In addition, although the upper sheet 332 and the lower sheet 322 in accordance with the previous embodiment of this invention are described as being coupled by the lamp housing 33 or the lamp holder 32.

In fact, the upper and lower sheets 332, 322 may be installed individually, and then fixed to the lamp housing 33, lamp holder 32, lower casing 35 or upper casing 37 by a fixture 351 or 371. Further, the fan 40 of this invention may be disposed next to the position between the ventilation outlet 39 and the lamp holder 31 for discharging the air from the ventilation outlet 39. The secondary ventilation outlet 34 may be part of the ventilation outlet 39 in order to simplify the structure of the casing. By the same token, the present invention can achieve the effect of cooling the casing.

What is claimed is:

1. A cooling apparatus for projector casing, comprising:
    a casing having an interior;
    a lamp holder fixed in the interior of the casing, and having at least one guiding surface on one side near the lower edge of the lamp holder;
    a ventilation outlet disposed on the casing and proximate the side of the lamp holder;
    an upper sheet disposed at the top of the lamp holder and keeping a distance from the casing to define an upper air duct;
    a lower sheet disposed at the bottom of the lamp holder and keeping a distance from the casing to define a lower air duct; and
    a fan disposed adjacent to the lamp holder.

2. The cooling apparatus for projector casing of claim 1, wherein the lower sheet is fixed onto the lower surface of the lamp holder.

3. The cooling apparatus for projector casing of claim 1, wherein the lower sheet is the lower surface of the lamp holder.

4. The cooling apparatus for projector casing of claim 1, wherein the casing in its interior has a lamp housing, and the lamp housing in its interior has a fixed lamp holder; and the lamp holder at its interior couples to a lamp.

5. The cooling apparatus for projector casing of claim 4, wherein the upper sheet is disposed on the upper surface of the lamp housing.

6. The cooling apparatus for projector casing of claim 5, wherein the upper sheet is the upper surface of the lamp housing.

7. The cooling apparatus for projector casing of claim 1, wherein the casing comprises an upper casing and a lower casing; a gap being kept between the upper casing and the upper sheet to define an upper air duct; and a gap being kept between the lower casing and the lower sheet to define a lower air duct.

8. The cooling apparatus for projector casing of claim 7, wherein the upper sheet is fixed onto the upper casing.

9. The cooling apparatus for projector casing of claim 7, wherein the lower sheet is fixed onto the lower casing.

10. The cooling apparatus for projector casing of claim 7, wherein the lower air duct having an outlet connected to a secondary ventilation outlet disposed at the lower side of the ventilation outlet.

11. The cooling apparatus for projector casing of claim 1, wherein the fan is disposed adjacent to the side of a lamp holder having the guidance surface.

* * * * *